United States Patent [19]
Thiel

[11] Patent Number: 5,350,042
[45] Date of Patent: Sep. 27, 1994

[54] AUTOMATIC ADJUSTING APPARATUS FOR A DISC BRAKE

[75] Inventor: Rudolf Thiel, Frankfurt am Main, Fed. Rep. of Germany

[73] Assignee: Alfred Teves GmbH, Fed. Rep. of Germany

[21] Appl. No.: 980,803

[22] PCT Filed: Jun. 26, 1991

[86] PCT No.: PCT/EP91/01189

§ 371 Date: Feb. 26, 1993

§ 102(e) Date: Feb. 26, 1993

[87] PCT Pub. No.: WO93/00526

PCT Pub. Date: Jan. 7, 1993

[30] Foreign Application Priority Data

Jun. 26, 1991 [DE] Fed. Rep. of Germany ....... 4121026

[51] Int. Cl.$^5$ .............................................. F16D 65/56
[52] U.S. Cl. ................................. 188/71.9; 188/72.6; 188/196 D
[58] Field of Search ............... 188/106 F, 355, 358, 188/359, 360, 199, 202, 203, 72.6, 72.7, 72.8, 72.9, 196 C, 196 M, 196 P, 196 BA, 196 D, 196 V; 192/111 A

[56] References Cited

U.S. PATENT DOCUMENTS

| 3,402,791 | 9/1968 | Hoenick | 188/106 F |
|---|---|---|---|
| 3,991,859 | 11/1976 | Coulter et al. | 188/106 F |
| 4,014,415 | 3/1977 | Pickel | 188/196 D X |
| 4,637,498 | 1/1987 | Thompson et al. | 188/196 V |
| 4,681,194 | 7/1987 | Tsuruta | 188/72.6 |
| 4,809,822 | 3/1989 | Margetts | 188/106 F |
| 4,981,197 | 1/1991 | Antony et al. | 188/196 D |
| 5,249,646 | 10/1993 | Thiel | 188/72.6 |

FOREIGN PATENT DOCUMENTS

| 0154398 | 9/1985 | European Pat. Off. . |
|---|---|---|
| 0196765 | 10/1986 | European Pat. Off. . |
| 0260934 | 3/1988 | European Pat. Off. . |
| 2445645 | 4/1976 | Fed. Rep. of Germany . |
| 3136958 | 3/1983 | Fed. Rep. of Germany . |
| 3802014 | 7/1989 | Fed. Rep. of Germany . |
| 3802014 | 7/1989 | Fed. Rep. of Germany . |
| 3943106 | 7/1991 | Fed. Rep. of Germany . |

Primary Examiner—Robert J. Oberleitner
Assistant Examiner—Lee W. Young
Attorney, Agent, or Firm—J. Gordon Lewis; Robert P. Seitter

[57] ABSTRACT

An automatic adjusting apparatus for a disc brake with a brake caliper housing. The disc brake is furnished with a brake piston which is slidingly positioned within a cylinder for the actuation of a brake shoe and which is actuatable by means of a hydraulic actuating device and a mechanical actuating device. The apparatus also includes an extendable adjusting unit which is disposed between the brake piston and the mechanical actuating device and includes an adjusting nut threadedly mounted on an adjusting spindle. The apparatus is arranged with a friction clutch to hold back one of the adjusting elements in the event of a mechanical actuation. The brake piston has a cylindrical portion which is directed into the interior of the brake piston and projects from the brake piston. The cylindrical portion of the brake piston is surrounded by the adjusting nut and a ring-shaped circumferential sealing element bears against an external surface of the cylindrical portion of the brake piston.

54 Claims, 6 Drawing Sheets

FIG.5

AUTOMATIC ADJUSTING APPARATUS FOR A DISC BRAKE

TECHNICAL FIELD

The present invention relates to an automatic adjusting apparatus for a disc brake.

BACKGROUND OF THE INVENTION

An adjusting apparatus for a disc brake of the type under consideration is known from the German patent application published without examination, No. 3,802,014. Two lip seals are positioned at a front end of an adjusting nut. The lip seals result in an increase in length of the adjusting nut in the axial direction, so that a larger mounting space for the adjusting apparatus as a whole is required.

SUMMARY OF THE INVENTION

It is an object of the present invention to reduce the axial mounting space of an adjusting apparatus for a disc brake. It is another object of the present invention to simplify the prior art adjusting apparatus and to render it cheaper.

According to the present invention, a cylinder, directed into the inner space of a brake piston, projects out of the bottom of the brake piston and is surrounded by an adjusting nut. One external surface of the cylinder interacts with a ring-shaped circumferential sealing element. As a result, in the presence of the full thickness of the brake linings, the spindle of the adjusting apparatus and the cylinder projecting into the brake piston toward the spindle are disposed near to each other and present a roughly equal diameter. A simple design, thus, results for the adjusting nut, since it need project beyond the end of the spindle, in axial direction, over the cylinder only by an amount sufficient to result in a firm fitting of a sealing element between the nut and the cylinder. In the event of pressurization, the sealing element prevents rotation of the adjusting nut relative to the brake piston. As a result, an adjustment is prevented during the pressure build-up, but slight axial movement is possible.

In one advantageous embodiment of the present invention, a second sealing element is provided which is retained through a spacer relative to the first sealing element, so that a hydraulically free space exists between the two sealing elements, and the seals can expand toward the hydraulically free space in the event of pressurization.

If, and when, an aeration duct is provided, atmospheric pressure can be maintained within the hydraulically free space even in the event of pressurization.

If, and when, both seals are fitted between the cylinder projecting into the brake piston and the internal cylinder surface of the nut, then, according to a simple design in accordance with the present invention, the bore can advantageously be drilled into the annular chamber from the point of intersection of the axis of symmetry of the piston and the front side of the piston. In this way, the bore will be disposed where there is available sufficient mounting space and where it is protected from dirt and mud by the brake shoe.

In another simple design in accordance with the present invention, one of the two seals is disposed on the inside cylindrical surface of the nut and the second seal is disposed on the outside cylindrical surface of the nut. In this way, the bore can end in the annular chamber at the front side of the piston. Again, the bore is positioned in a range in which sufficient mounting space is available.

In one simple design in accordance with the present invention, the adjusting nut is furnished with a friction cone at its front side facing the bottom of the piston. This friction cone at the front side of the nut is easy to fabricate.

When the external diameter of the adjusting nut increases toward the bottom of the piston, then, due to the large diameter, the surface of the friction cone also will increase. As a result, the piston and the adjusting nut will come into abutment in the event of a mechanical actuation and rotation of the nut will be prevented.

In one simple and cost-effective design in accordance with the present invention, the internal bore of the adjusting nut is configured in the shape of a stepped bore.

If, and when, a ball bearing is disposed on the outer surface of the adjusting nut, then this outer surface can advantageously serve to accommodate the ball bearing and no separate components are necessary.

If, and when, the ball bearing is is arranged to bear against the end of the nut having an increased diameter, smaller frictional resistance results.

In one simple design in accordance with the present invention, the adjusting spindle, with a radially extending attachment, engages a recess in the brake housing, so that, although being axially slidable relative to each other, the spindle and the housing are, however, not rotatable relative to each other.

In one simple design in accordance with the present invention, the sealing element has a U-shape cross-section with two legs and one base leg, so that, in the event of pressurization, the two legs of the U-shaped sealing element bear, on one side, against the adjusting nut and, on the other side, against the brake piston, thereby preventing any rotating movement.

In one advantageous embodiment of the present invention, the sealing elements and the spring forces of the springs are dimensioned, in respect of each other, so that an adjustment takes place exclusively in the defined condition.

In another embodiment of the present invention, circumferential lips are provided at the sleeves which are non-rotatably coupled to the adjusting nut. These lips bear against a cylindrical surface of the brake piston. Due to the small bearing surfaces of the sealing lips, only a minimum frictional engagement will exist between the brake piston and the adjusting nut as long as the hydraulic pressure in the hydraulic actuating apparatus is slight. The adjusting nut can rotate freely during the adjusting procedure. In the event of a higher hydraulic pressure, the radially internal surface of the sleeve will be urged against the cylindrical surface of the brake piston. Because of the large bearing surface, a frictional engagement will be created between the brake piston and the adjusting nut which is so strong that rotation of the adjusting nut will no longer be possible.

In accordance with the present invention, an aeration duct will be expedient in order to safeguard that atmospheric pressure always exists between the sleeve and the cylindrical projection of the brake piston.

The present invention offers particular reliability in operation. If, for example, the adjusting nut is clamped and fails to rotate, notwithstanding an increasing wear of the lining, then a large axial relative movement between the adjusting nut and the brake piston can occur.

The non-rotatable coupling between the sleeve and the adjusting nut, according to the present invention, allows a large relative movement without the sleeve sliding axially with respect to the brake piston and without its sealing effect being impaired. The risk of a failure of the hydraulic actuating unit, due to loosening, will, thus, be avoided.

In accordance with the present invention, an inserted element is provided within the cavity. The inserted element has the advantage that the frictional force will allow exact adaptation to the requirements by an appropriate selection of its dimensions and of the material.

Embodiments of the invention will be explained in more detail in the following description making reference to the accompanying drawings.

DETAILED DESCRIPTION OF THE INVENTION

In the Figures, identical components or those corresponding to one another are given identical reference numerals.

Figure 1:
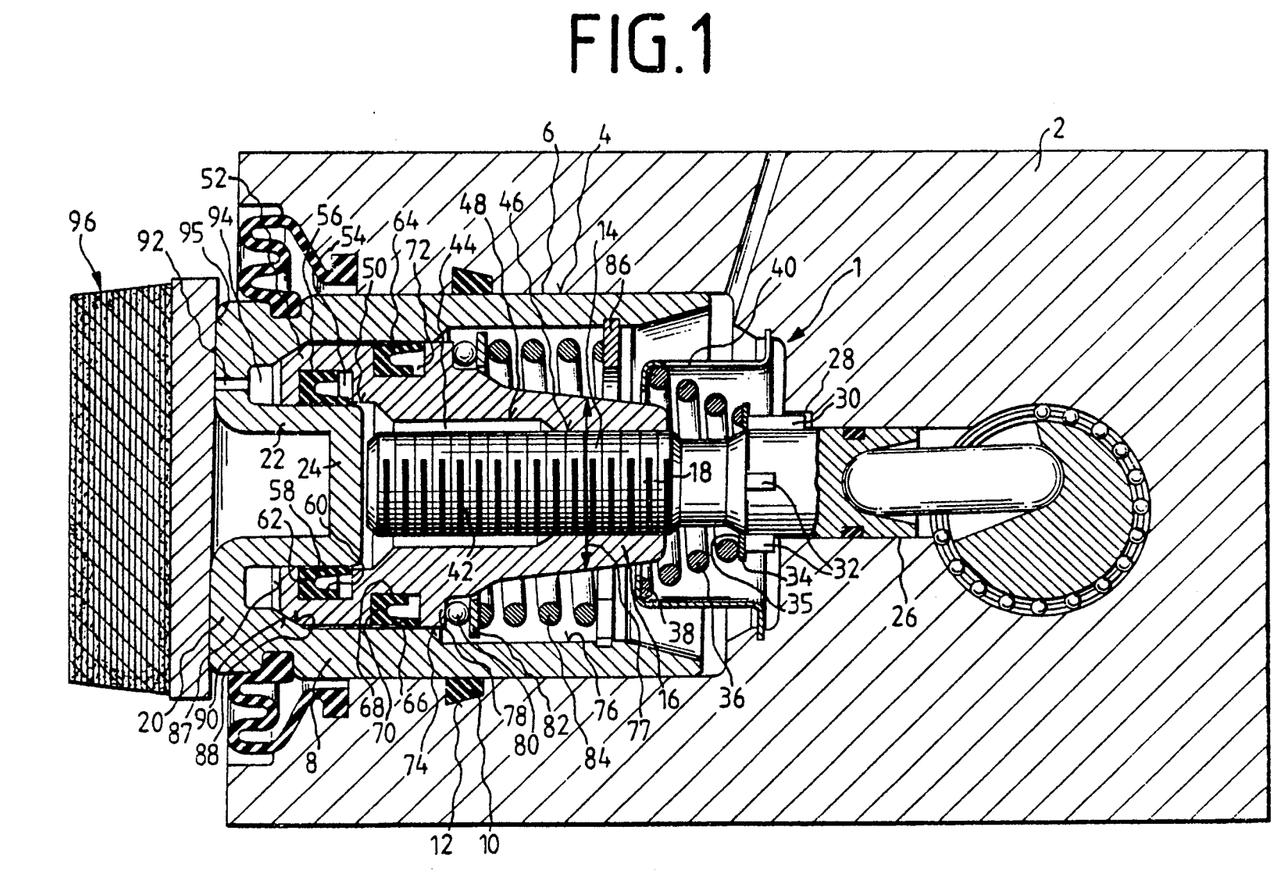
FIG. 1 shows a longitudinal section through an adjusting apparatus of a disc brake whose piston is furnished with an inwardly projecting cylinder.

First of all, reference is made to FIG. 1 which shows a longitudinal section through part of a disc brake with an adjusting apparatus 1. Within a brake housing 2, a stepped cylindrical bore 4 is provided. A brake piston 8 is positioned for axially sliding movement within that portion of the cylindrical bore 4 having the largest diameter, namely bore portion 6. The brake piston 8 has a cup-shaped configuration, its open end being located within the cylindrical bore 4, whereas its closed end projects from the cylindrical bore 4 and bears against a brake shoe 96. For the purpose of sealing the brake piston 8, a so-called roll-back seal 10 is positioned, as in the prior art, within an annular groove 12 in the brake housing 2, which also causes the brake piston 8 to be restored.

Two adjusting elements 14, 16 of the adjusting apparatus 1, namely an adjusting spindle 14 and an adjusting nut 16, are coupled to each other through a thread 18 which is free of nonreversibility. An inwardly extending cylinder 22 is formed at the bottom 20 of the piston 8. Cylinder 22 is closed by a second bottom 24 which is offset in respect of the first bottom 20. The spindle 14 is guided in a bore section 26 having a reduced diameter and extends to the bottom 24 of cylinder 22. At one end of the bore section 26, a recess, in the shape of a longitudinal groove 28, is provided which is engaged by an attachment 30 of the spindle 14 which extends radially outward. As a result, spindle 14 is secured against rotation. The attachment 30 and three other attachments 32, all of which extend to the same axial point, are distributed over the circumference of the spindle 16, so that a ring-shaped disc 34 can abut against the attachments 30, 32 in this range. The ring-shaped disc 34 forms an abutment surface 35 for a spindle spring 36 which takes support at its other end 38 within a bushing 40 which is fixed to the housing. At its end facing the piston bottom 20, the spindle 14 is coupled to the adjusting nut 16 through thread 18 which is free of nonreversibility. The adjusting nut 16 is formed with a triple-stepped through bore 44 presenting a smaller step 46, a larger step 48 and a large-size step 50. In this configuration, the diameter of the triple-stepped through bore 44 increases in the direction toward the bottom 20 of the brake piston. The thread 18 is engaged at the smallest step 46 of the adjusting nut. An end section 52 of the adjusting nut 16 having the largest diameter bore 50 surrounds the cylinder 22 of brake piston 8. End section 52 is formed with an annular circumferential internal groove 54 within which a seal 56 of U-shaped cross-section is positioned. The U-shaped seal is substantially comprised of two parallel legs 58, 60 and a base leg 62. In the event of pressurization, the leg 58 bears against the cylinder 22 of the brake piston and the legs 60, 62 bear against the end section 52 of adjusting nut 16. Another seal 64 of U-shaped cross-section, comprising legs 66, 68 and the base leg 70, is inserted in a groove 72 in an external surface 74 of the nut 16. In the event of pressurization, the leg 68 and the base leg 70 bear against the external surface 74 of the nut 16 and the leg 66 bears against the internal cylindrical surface 76 of the brake piston 8. The external diameter 77 of the adjusting nut 16 increases in the direction of the bottom 20 of the brake piston 8 and, with a section 78, has a bell-shape form. Ball bearings 80, which bear against attachment 78, are retained by a spring 84 through a ring-shaped disc 82. The spring 84 takes support at an internal ring 86 located within the brake piston 8. The front side 88 of brake piston 8 is urged against the brake shoe 96. An aeration duct 92, extending through the bottom of brake piston 8, leads to an annular chamber 94 between the two sealing elements 56, 64. When the sealing elements 56, 64 are subjected to the action of a hydraulic fluid, atmosphere may penetrate through the aeration duct 92 and will cause the braking action of the sealing elements 56, 64. The front side 87 of end section 52 of the adjusting nut 16 is formed with a friction cone 88 which bears against a matching friction cone 90 of the brake piston 8.

Figure 2:
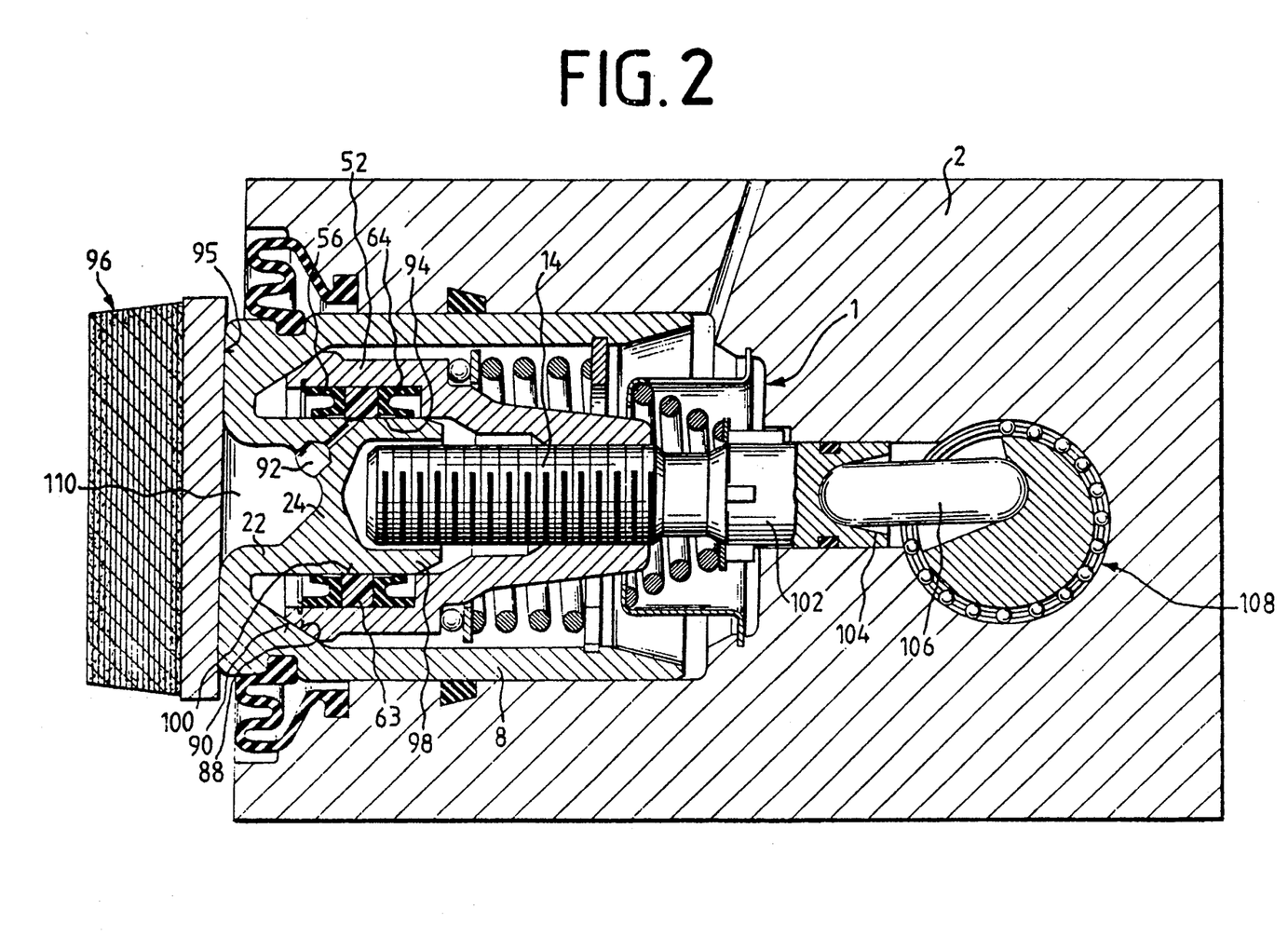
FIG. 2 shows a longitudinal section through an adjusting apparatus of a disc brake whose cylinder straddles the adjusting spindle.

FIG. 2 shows the adjusting apparatus 1 in the brake housing 2 of the spot-type disc brake with a brake piston 8. The brake piston cylinder 22 has a bushing 98 which extends beyond the bottom portion 24. The bushing 98 partly surrounds the lower end 42 of the spindle 14. In this configuration, both sealing elements 56, 64 can bear against the external cylindrical surface 100 of the brake piston cylinder 22. With this arrangement, the end section 52 of the bell-shaped adjusting nut 16 is sturdy over the axial length at a uniform radius, so that the transmission of force to the friction cones 88, 90 is ensured. A spacer 63 is positioned between the two sealing elements 56, 64. At its end portion 102 remote from the brake shoe 96, the adjusting spindle 14 is formed with a parabolic recess 104 which is engaged by a thrust element 106 of an eccentric apparatus 108. The eccentric apparatus 108 serves to transmit the mechanical brake actuation. At the front side of the brake piston 8, a cylindrical recess 110 is provided from which an aeration duct 92 leads to the annular chamber 94 between the sealing elements 56, 64.

Figure 3:
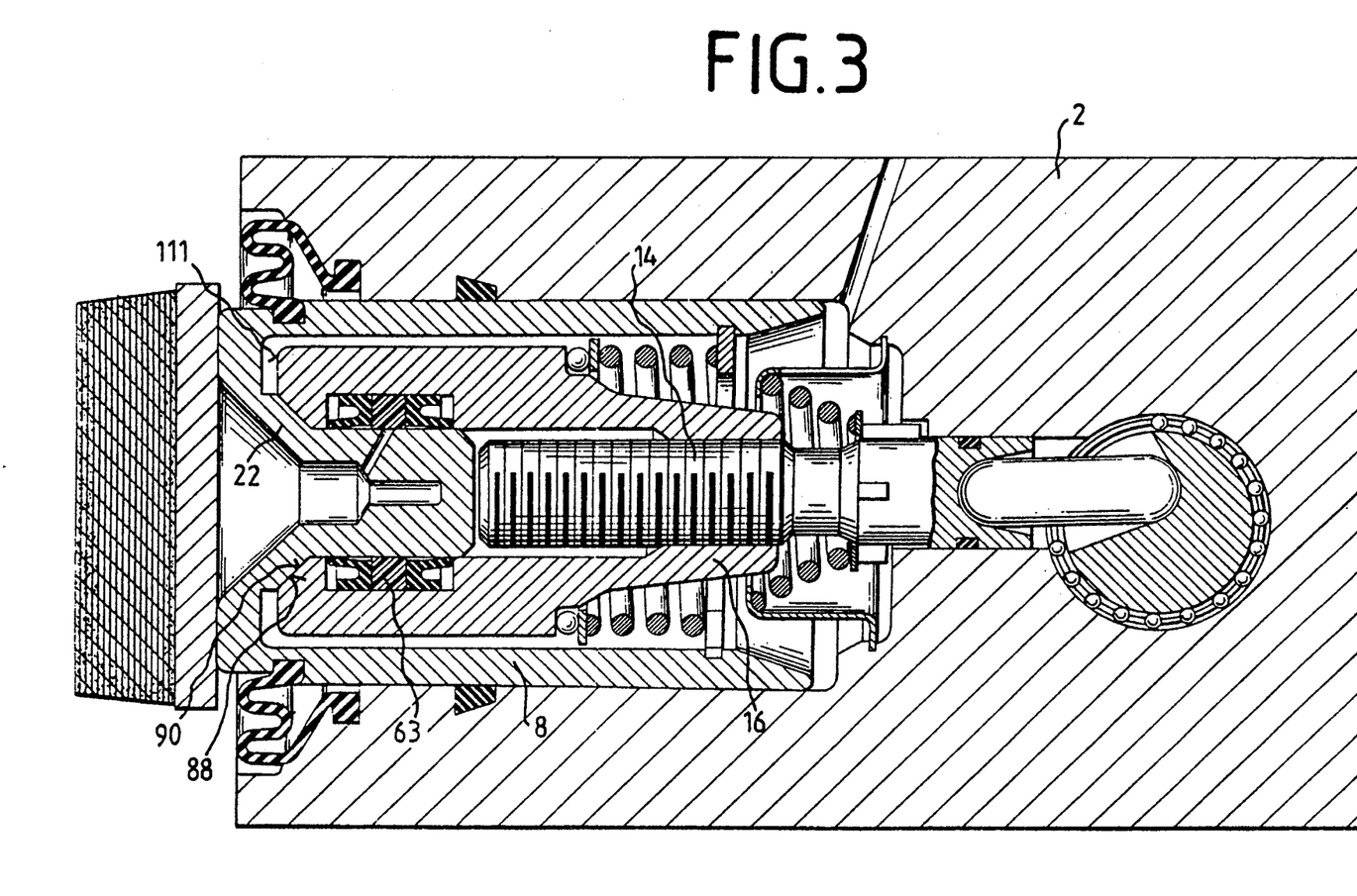
FIG. 3 shows a longitudinal section through an adjusting apparatus of a disc brake whose adjusting nut is formed with a radially internal cone.

FIG. 3 shows an adjusting nut 16 in which the friction cone 88 is inclined from the front side of the adjusting nut toward the bore 15, that is to say, inwardly. The cone 90 is, thus, formed at the inwardly projecting cylinder 22 of the brake piston 8.

Figure 4:
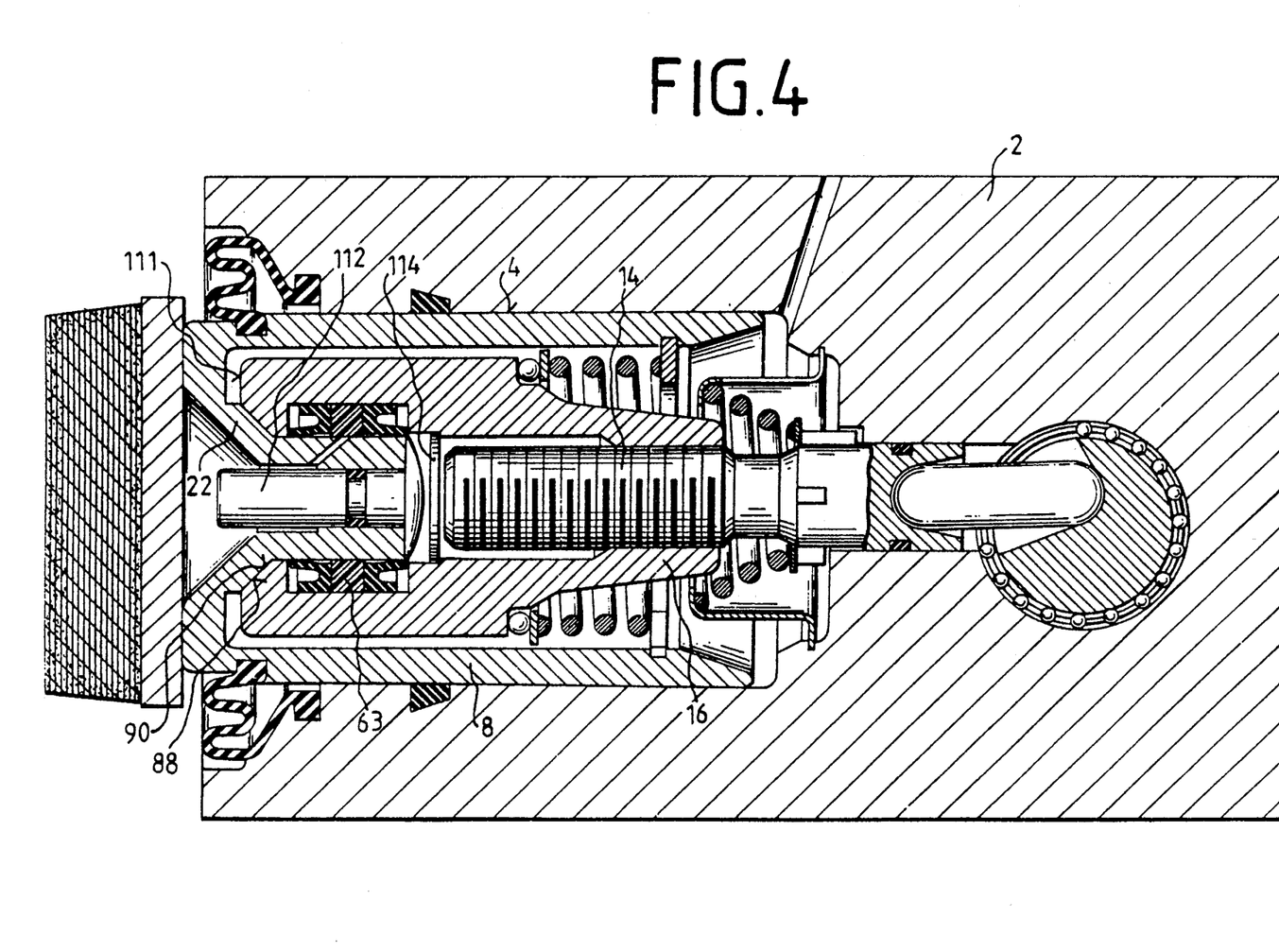
FIG. 4 shows a longitudinal section through an adjusting apparatus according to FIG. 3 with a restoring pin.

FIG. 4 shows a pin 112 in the brake piston cylinder 22. Pin 112 serves to restore the adjusting apparatus. When the brake lining has worn out, the piston 8, along with adjusting nut 16, are removed from the housing 2. When the pin 112 is pressed against a pressure plate 114 which is inserted in the adjusting nut 16, the friction cones 88, 90 will be separated from each other and the nut 16 can be turned on the spindle 14 back in the direction toward the interior space of the cylindrical bore 4.

The main features which result are a functionally reliable adjustment in the pressureless condition, no seizing due to an expansion of the caliper, cost-effective manufacture, and operating errors not affecting the adjustment. Furthermore, an extruded piston is utilized with an internal brake cylinder 22 and brake cone for the transmission of the force of the parking brake. An extruded bushing 16 results with multiplex thread and with two braking and sealing elements which are disposed within the bushing, and with an inwardly directed brake cone and with an open internal diameter for a cost-effective series manufacture. In the event of a change of the lining, the piston is rotated in order to make it return into its starting position. In FIG. 4, the restoring force is transmitted to the disc by pressing the pin 112. The disc will then cancel the braking effect of the cone and will, thus, let the bushing rotate freely until the piston has reached its starting position.

Figure 5:
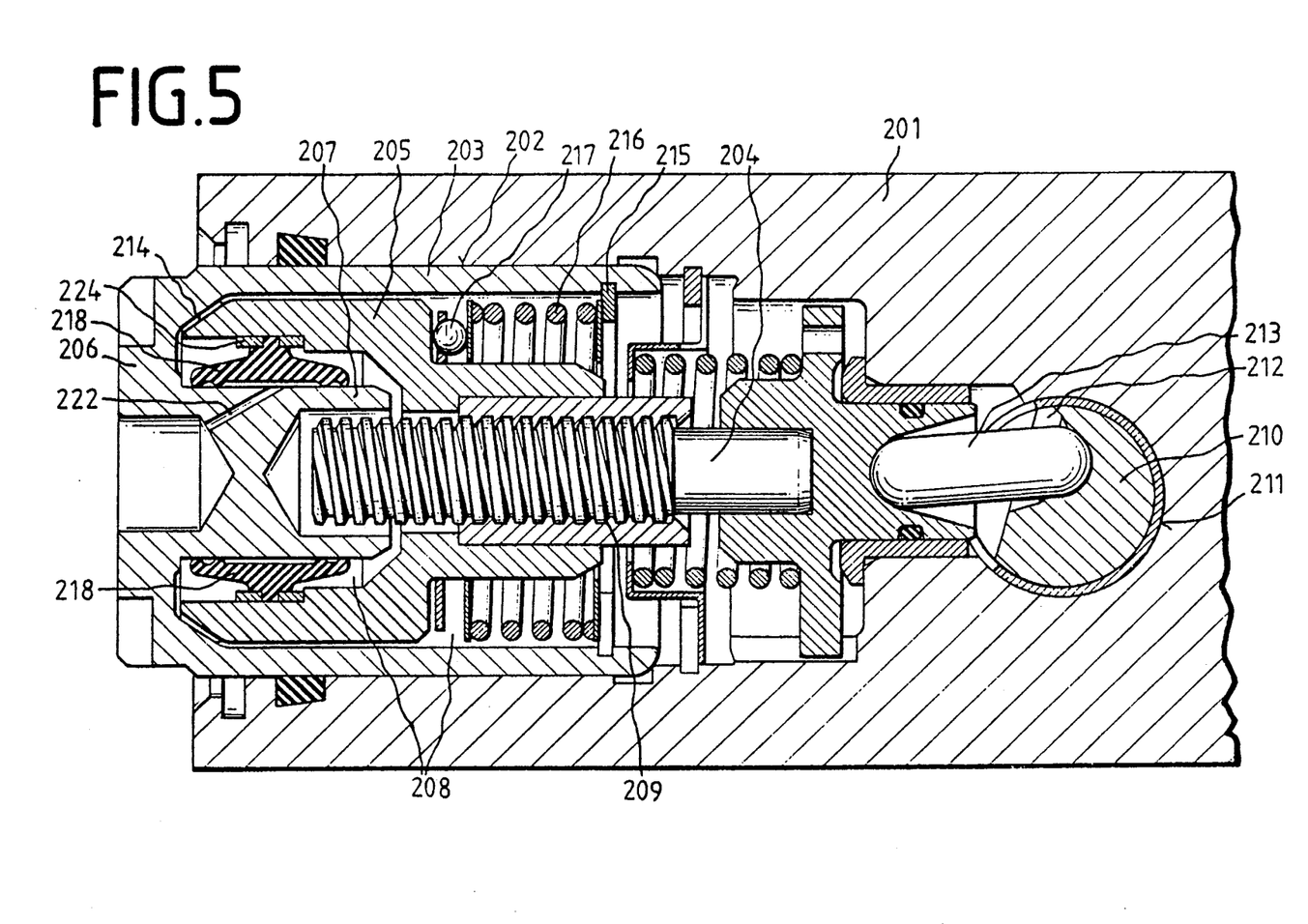
FIG. 5 shows a longitudinal section through an adjusting apparatus with a sleeve.

The adjusting apparatus illustrated in FIG. 5 is comprised of a housing 201 with a stepped brake cylindrical bore 202 within which a hollow brake piston 203 and an adjusting element, composed of a spindle 204 and an adjusting nut 205, are accommodated for axially sliding movement. Starting from the bottom 206 of the brake piston 203, a cylindrical projection 207 extends into the interior space 208. The adjusting nut 205 extends within the interior of the brake piston 203 beyond the projection 207 and is coupled through a thread 209, free of nonreversibility, to the spindle 204.

A shaft 210, which is rotatably supported within a bore 211 of the housing 201 and which is furnished with an eccentric recess 212, serves for the actuation of the mechanical actuating apparatus. One end of a pressure pin 213 is received by the eccentric recess 212. The other end of the pressure pin 213 acts on the spindle 204. A rotation of the shaft 210 is converted through the pressure pin 213 into an axial movement of the spindle 204. The spindle 204 transmits the movement through the thread 209 to the adjusting nut 205 until its friction cone 214 bears against the brake piston 203 and the brake piston also slides. The brake piston 203 will then urge a brake shoe, which is not shown in FIG. 5, against a brake disc also not shown in in FIG. 5. Subsequently, a tractive force will be transmitted through the aforesaid components from the shaft 210 to the brake shoe. During this operation, the adjusting nut 205 cannot rotate because of the closed friction clutch 214.

For the mechanical actuation of the hydraulic actuating apparatus, the interior space 208 will be subjected to hydraulic pressure until the brake piston 203 slides in the axial direction and presses onto the brake shoe. As the wear of the brake linings proceeds, the actuating distance to be covered by the piston will become larger and the automatic adjusting apparatus will start to operate when the mechanical actuating apparatus is in its position of rest. The brake piston 203 will act through a disc 215, a helical spring 216 and a ball bearing 217 on the adjusting nut 205. Since now the friction clutch 214 will be open, the adjusting nut 205 will rotate on the spindle 204 until the extended actuating distance is balanced.

Figure 6:
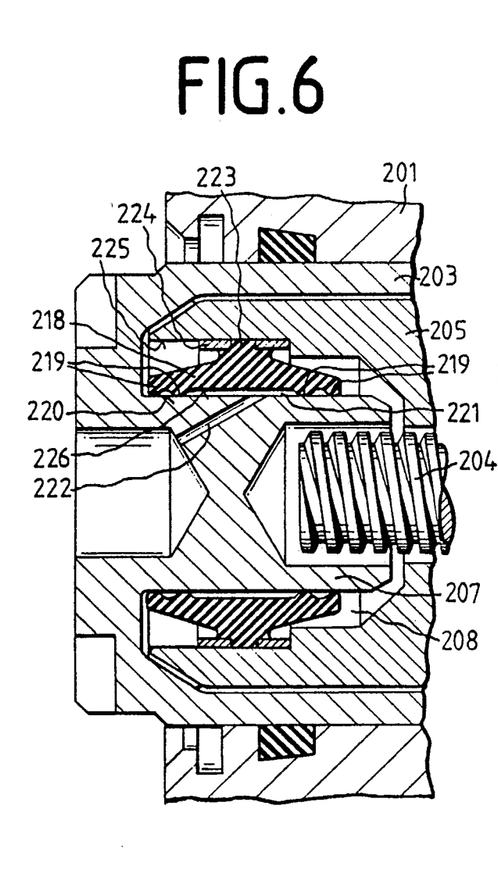
FIG. 6 shows an enlarged partial view of FIG. 5.

As will best be seen from FIG. 6, a sleeve 218 is positioned between the adjusting nut 205 and the cylindrical projection 207 of the brake piston 203. The sleeve 218 is formed with four circumferential sealing lips 219 which bear against the peripheral area 220 of the projection 207. The cavity 221 which is formed by the sleeve 218 and the projection 207 is connected through an aeration duct 222 to the external space, so that atmospheric pressure will always exist in the cavity 221. The sleeve 218 is furnished with a plurality of radial projections 223 which project into associated openings of a rigid ring 224. The ring 224 is pressed into a bore 225 of the adjusting nut 205. In this manner, a non-rotatable coupling is established, so that any rotating movement, and, consequently, any torque will be transmitted by the adjusting nut 205 to the sleeve 218.

In the event of only a slight hydraulic pressure within the interior space 208, only the sealing lips 219 will be in contact against the area 220, so that the adjusting nut 205 can easily rotate and an adjustment will take place. In the event of an elevated hydraulic pressure, that is to say, when the pressure differential between the interior space 208 and the cavity 221 exceeds a predetermined value, the relatively large internal surface 226 will be urged against the area 220, and a frictional engagement will be established between the brake piston 203 and the sleeve 218. The adjusting nut 205 will not, under such conditions, be able to rotate. Now, when, in the presence of an elevated hydraulic pressure, an extended actuating distance comes about due to an elastic expansion of the brake caliper, then this distance will not be balanced by the adjusting apparatus.

Figure 7:
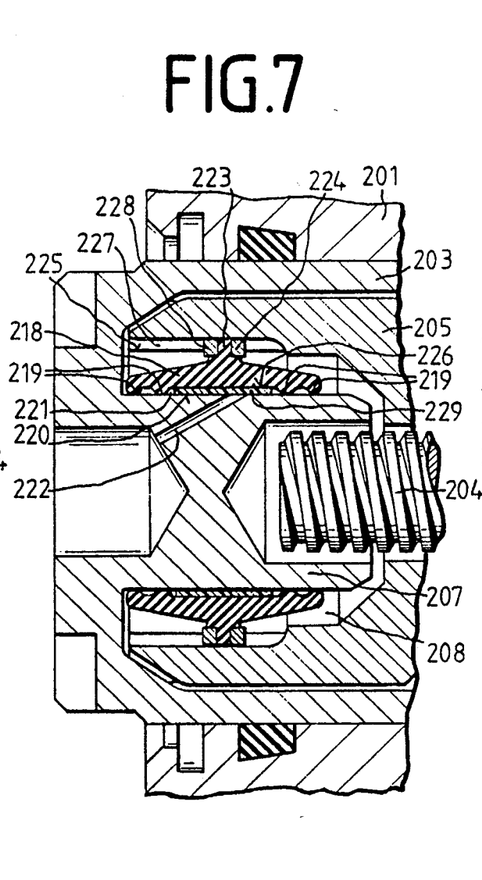
FIG. 7 shows an enlarged partial view of a second embodiment.

In FIG. 7, a further embodiment is illustrated. Here, the rigid ring 224 is not pressed in as in FIG. 6 but is axially slidable relative to the adjusting nut 205. The adjusting nut is provided with an axially extending groove 227 which is engaged by a radial projection 228 of the ring 224 in order to couple the sleeve 218 non-rotatably to the adjusting nut 205. This arrangement permits a large axial relative movement between the adjusting nut 205 and the brake piston 203. Any failure of the brake on account of a lack of tightness caused by a slip of the sleeve 218 on the cylindrical projection 207 will be effectively avoided. Within the cavity 221, between the radially internal surface 226 of the sleeve 218 and the peripheral area 220 of the cylindrical projection 207, a bushing-shaped insert element 229 of plastic material is positioned which serves to adapt the frictional conditions to the requirements.

Figure 8:
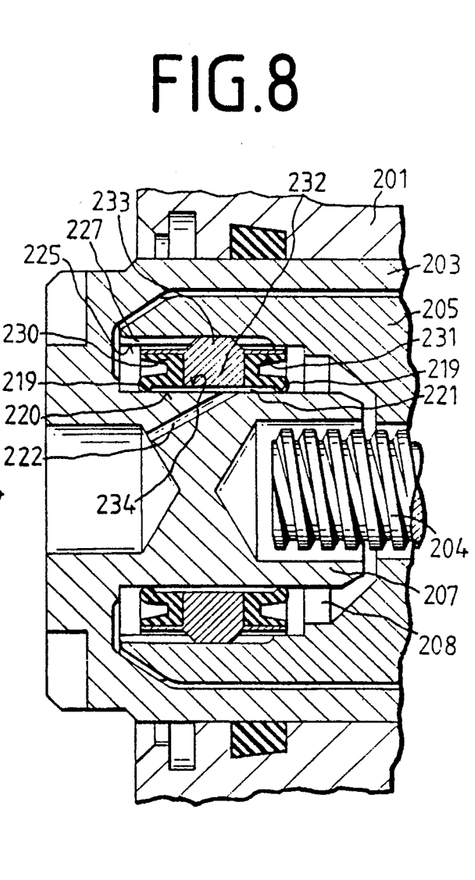
FIG. 8 shows an upscaled partial view of a third embodiment.

FIG. 8 shows a last embodiment in which two elastic sleeves 230, 231 having a U-shaped cross-section are used. These sleeves are each formed with one sealing lip 219 which bears against the area 220. A rigid ring 232 having a T-shaped section is furnished with a radial projection 233 which engages the groove 227. As a result, the ring 232, together with the sleeves 230, 231, can again easily slide in the axial direction relative to the adjusting nut 205, whereas rotation will be prevented. The radially internal surfaces 234 of the sleeves 230, 231 will bear against the area 220 when the interior space 208 is subjected to an elevated hydraulic pressure. Due to the frictional engagement, the adjusting nut 205 will be coupled non-rotatably to the brake cylinder, so that no adjustment can take place. In the event of a malfunction, the adjusting nut 205 will, however, be able to move in the axial direction with respect to the brake piston 203 without the sleeves 230, 231 and the ring 232 sliding out of their correct mounting position and without the tightness of the hydraulic actuating apparatus being impaired.

I claim:

1. An automatic adjusting apparatus for a disc brake with a brake caliper housing,
   the disc brake being furnished with a brake piston, having a bottom, which is slidingly positioned within a cylindrical bore of the brake caliper housing for the actuation of a brake shoe and which is actuatable by means of a hydraulic actuating device and a mechanical actuating device;
   with an extendable adjusting member which is disposed between said brake piston and said mechanical actuating device and is furnished with two adjusting elements being connected to each other through a thread free of nonreversibility, said adjusting elements being configured in the shape of an adjusting nut and of an adjusting spindle; and
   with a friction clutch to hold back one of said adjusting elements in the event of a mechanical actuation,
   characterized in that said brake piston includes a cylinder directed into the interior of said cylindrical bore and which projects out of the bottom of said brake piston, wherein said cylinder is encased by said adjusting nut, and in that an external cylindrical surface of said cylinder interacts with a ring-shaped circumferential sealing element.

2. An adjusting apparatus as claimed in claim 1, characterized in that a second ring-shaped circumferential sealing element interacts with an internal surface of said brake piston.

3. An adjusting apparatus as claimed in claim 2, characterized in that an aeration duct ends up into an annular chamber between said first and second sealing elements.

4. An adjusting apparatus as claimed in claim 1, characterized in that said cylinder includes a bushing, which extends the length of said cylinder.

5. An adjusting apparatus as claimed in claim 2, characterized in that said first and second sealing elements are positioned in a groove of said adjusting nut, wherein said groove is open toward a front side of said brake piston.

6. An adjusting apparatus as claimed in claim 1, characterized in that said adjusting nut is furnished with a friction cone at its front side facing the bottom of said brake piston.

7. An adjusting apparatus as claimed in claim 6, characterized in that said adjusting nut has an external diameter which increases toward the bottom of said brake piston.

8. An adjusting apparatus as claimed in claim 7, characterized in that said adjusting nut has an internal bore which is configured in the shape of a stepped bore.

9. An adjusting apparatus as claimed in claim 8, wherein said adjusting nut has an external surface and a ball bearing is disposed axially on the external surface of said adjusting nut.

10. An adjusting apparatus as claimed in claim 9, characterized in that said ball bearing is abutted against a portion of said adjusting nut having an increased diameter.

11. An adjusting apparatus as claimed in claim 1, characterized in that a radially extending attachment of said adjusting spindle engages a recess of the brake caliper housing.

12. An adjusting apparatus as claimed in claim 11, characterized in that said sealing element is configured U-shape with two legs and one base leg.

13. An adjusting apparatus as claimed in claim 12, characterized in that in the event of a slight hydraulic pressure the abutment forces of said sealing elements are so great that the spring force of a spindle spring allows to be overcome.

14. An automatic adjusting apparatus for a disc brake with a brake caliper which is furnished with a brake cylinder and a hollow brake piston, having a bottom, being slidingly positioned within said brake cylinder; with a hydraulic and a mechanical actuating device; with an extendable adjusting member which is positioned between said brake piston and said mechanical actuating device and which is comprised of an adjusting spindle and of an adjusting nut being coupled to said adjusting nut through a thread which is free of nonreversibility; with a cylindrical projection which juts out of the bottom of said brake piston into its interior space, said adjusting nut extending beyond the peripheral area of said projection; and with at least one ring-shaped circumferential, elastic sleeve which is positioned on said peripheral area of said cylindrical projection, wherein said at least one sleeve includes at least one of:
   (a) one sleeve which is formed with at least two circumferential sealing lips and
   (b) two sleeves interacting with each other and each formed with at least one circumferential sealing lip at an axial distance from each other and in abutment against said peripheral area of said cylindrical projection,
   wherein a radially internal surface of said at least one sleeve is not in abutment against said peripheral area as long as the hydraulic pressure does not exceed a determined value, and in that said at least one sleeve is unrotatably coupled to said adjusting nut.

15. An adjusting apparatus as claimed in claim 14, characterized in that between said radially internal surface of said at least one sleeve and said peripheral area, a ring-shaped cavity remains and in that said cavity is connected to an external space through an aeration duct.

16. An adjusting apparatus as claimed in claim 15, characterized in that said adjusting nut is furnished with a stepped bore and in that said at least one sleeve is unrotatably coupled to a rigid ring which is pressed into said stepped bore.

17. An adjusting apparatus as claimed in claim 14, characterized in that said adjusting nut is furnished with a bore and with at least one groove which extends axially in the bore, and in that said at least one sleeve is unrotatably coupled to a rigid ring which is formed with at least one radial projection extending into said groove and permitting an axial movement.

18. An adjusting apparatus as claimed in claim 17, characterized in that said ring is furnished with radial openings into which radial projections of said at least one sleeve extend.

19. An adjusting apparatus as claimed in claim 15, characterized in that an inserted element is positioned within said cavity between said radially internal surface of said at least one sleeve and said peripheral area of said cylindrical projection.

20. An adjusting apparatus as claimed in claim 19, characterized in that said inserted element is constituted by a plastic material bushing which is adapted to a friction value and which is pushed over said cylindrical projection.

21. Apparatus for automatically adjusting a disc brake, said apparatus comprising:
a brake shoe;
a housing having a cylindrical bore;
a brake piston positioned within said cylindrical bore for sliding movement along said cylindrical bore to actuate said brake shoe in response to a hydraulic actuating device and a mechanical actuating device, said brake piston having a cylindrical portion extending into the interior of said brake piston from an end of the said brake piston which actuates said brake shoe;
an extendable adjusting unit disposed between said brake piston and said mechanical actuating device and including:
(a) a threaded spindle coupled to said mechanical actuating device, and
(b) a nut threadedly engaging said threaded spindle and having a portion which:
(i) extends over and surrounds said cylindrical portion of said brake piston, and
(ii) is adapted to bear against said brake piston to prevent relative rotation between said nut and said brake piston;
and a ring-shaped circumferential sealing element disposed between said cylindrical portion of said brake piston and said portion of said nut which extends over and surrounds said cylindrical portion of said brake piston.

22. Apparatus for automatically adjusting a disc brake according to claim 21 further including a second ring-shaped circumferential sealing element disposed between an external surface of said nut and said brake piston.

23. Apparatus for automatically adjusting a disc brake according to claim 21 further including a second ring-shaped circumferential sealing element disposed between said cylindrical portion of said brake piston and an internal surface of said portion of said nut which extends over and surrounds said cylindrical portion of said brake piston.

24. Apparatus for automatically adjusting a disc brake according to claim 22 wherein there is an annular chamber between said ring-shaped circumferential sealing elements and an aeration duct extends through said brake piston to said annular chamber.

25. Apparatus for automatically adjusting a disc brake according to claim 23 wherein there is an annular chamber between said ring-shaped circumferential sealing elements and an aeration duct extends through said brake piston to said annular chamber.

26. Apparatus for automatically adjusting a disc brake according to claim 25 wherein said cylindrical portion of said brake piston extends over and surrounds a portion of said threaded spindle.

27. Apparatus for automatically adjusting a disc brake according to claim 24 wherein said nut has first and second annular grooves within which one of said ring-shaped circumferential sealing elements is individually disposed.

28. Apparatus for automatically adjusting a disc brake according to claim 25 wherein said nut has an annular groove within which said ring-shaped circumferential sealing elements are disposed.

29. Apparatus for automatically adjusting a disc brake according to claim 27 wherein said piston has an internal conical surface and said portion of said nut which extends over and surrounds said cylindrical portion of said brake piston has an external conical surface which is adapted to bear against said internal conical surface of said brake piston to prevent relative rotation between said nut and said brake piston.

30. Apparatus for automatically adjusting a disc brake according to claim 29 wherein said piston has an internal conical surface and said portion of said nut which extends over and surrounds said cylindrical portion of said brake piston has an external conical surface which is adapted to bear against said internal conical surface of said brake piston to prevent relative rotation between said nut and said brake piston.

31. Apparatus for automatically adjusting a disc brake according to claim 29 wherein said nut has a bore which increases in diameter toward said portion of said nut which extends over and surrounds said cylindrical portion of said brake piston.

32. Apparatus for automatically adjusting a disc brake according to claim 30 wherein said nut has a bore which increases in diameter toward said portion of said nut which extends over and surrounds said cylindrical portion of said brake piston.

33. Apparatus for automatically adjusting a disc brake according to claim 31 wherein said bore of said nut is a stepped bore.

34. Apparatus for automatically adjusting a disc brake according to claim 33 wherein said bore of said nut is a stepped bore.

35. Apparatus for automatically adjusting a disc brake according to claim 33 further including means for urging said nut to bear against said brake piston and a bearing disposed between axially spaced points on said means and said nut for facilitating rotational movement of said nut relative to said threaded spindle when said nut does not bear against said brake piston.

36. Apparatus for automatically adjusting a disc brake according to claim 34 further including means for urging said nut to bear against said brake piston and a bearing disposed between axially spaced points on said means and said nut for facilitating rotational movement of said nut relative to said threaded spindle when said nut does not bear against said brake piston.

37. Apparatus for automatically adjusting a disc brake according to claim 35 wherein said nut has an external surface which increases in diameter along the axial length of said nut toward said external conical surface of said nut and said point on said nut is at the largest diameter of said nut.

38. Apparatus for automatically adjusting a disc brake according to claim 36 wherein said nut has an external surface which increases in diameter along the axial length of said nut toward said external conical surface of said nut and said point on said nut is at the largest diameter of said nut.

39. Apparatus for automatically adjusting a disc brake according to claim 37 further including means for preventing relative rotation between said threaded spindle and said housing.

40. Apparatus for automatically adjusting a disc brake according to claim 38 further including means for preventing relative rotation between said threaded spindle and said housing.

41. Apparatus for automatically adjusting a disc brake according to claim 22 wherein each of said ring-shaped circumferential sealing elements has a U-shaped cross-section comprising two legs and a base with:
  (a) one of said legs of one of said sealing elements bearing against said cylindrical portion of said brake piston and the other of said legs of said one sealing element bearing against said internal surface of said nut and said base of said one sealing element bearing against said internal surface of said nut, and
  (b) one of said legs of the other of said sealing elements bearing against said brake piston and the other of said legs of said other sealing element bearing against said external surface of said nut and said base of said other sealing element bearing against said external surface of said nut.

42. Apparatus for automatically adjusting a disc brake according to claim 23 wherein each of said ring-shaped circumferential sealing elements has a U-shaped cross-section comprising two legs and a base with:
  (a) one of said legs of one of said sealing elements bearing against said cylindrical portion of said brake piston and the other of said legs of said one sealing element bearing against said internal surface of said nut and said base of said one sealing element bearing against said internal surface of said nut, and
  (b) one of said legs of the other of said sealing elements bearing against said cylindrical portion of said brake piston and the other of said legs of said other sealing element bearing against said internal surface of said nut and said base of said other sealing element bearing against said internal surface of said nut.

43. Apparatus for automatically adjusting a disc brake according to claim 21 further including a pin mounted for axial movement through said cylindrical portion of said brake piston.

44. Apparatus for automatically adjusting a disc brake, said apparatus comprising:
  a brake shoe;
  a brake cylinder;
  a hollow brake piston positioned for sliding movement within said brake cylinder to actuate said brake shoe and having a cylindrical portion extending into the interior of said brake Distort from an end of said brake piston which actuates said brake shoe;
  a hydraulic unit for moving said brake piston to actuate said brake shoe;
  a mechanical unit for moving said brake piston to actuate said brake shoe;
  an extendable adjusting unit disposed between said brake piston and said mechanical actuating device and including:
    (a) a threaded spindle coupled to said mechanical unit, and
    (b) a nut threadedly engaging said threaded spindle and having a portion which:
      (i) extends over and surrounds said cylindrical portion of said brake piston, and
      (ii) is adapted to bear against said brake piston to prevent relative rotation between said nut and said brake piston;
  and a ring-shaped, circumferential elastic sleeve fixed to said adjusting nut and formed with:
    (a) at least two circumferential, axially spaced apart sealing lips which bear against said cylindrical portion of said brake piston, and
    (b) a circumferential surface between said sealing lips and spaced from said cylindrical portion of said brake piston as long as hydraulic pressure applied by said hydraulic unit does not exceed a predetermined level.

45. Apparatus for automatically adjusting a disc brake according to claim 44 wherein an aeration duct extends through said brake piston to the space defined by said sealing lips and said circumferential surface between said sealing lips.

46. Apparatus for automatically adjusting a disc brake according to claim 45 Wherein said nut has a stepped bore and said apparatus further includes a rigid ring pressed into said stepped bore and to which said elastic sleeve is fixed.

47. Apparatus for automatically adjusting a disc brake according to claim 46 wherein said rigid ring has radial openings and said sleeve has radial projections which extend into said radial openings.

48. Apparatus for automatically adjusting a disc brake according to claim 46 further including a bushing fitted over said cylindrical portion of said brake piston and within said space defined by said sealing lips and said circumferential surface between said sealing lips.

49. Apparatus for automatically adjusting a disc brake according to claim 45 wherein said nut has a bore and a groove extending axially of said bore and said apparatus further includes a rigid ring to which said elastic sleeve is fixed and having a radial projection extending into said groove for axial movement of said rigid ring.

50. Apparatus for automatically adjusting a disc brake according to claim 49 wherein said rigid ring has radial openings and said sleeve has radial projections which extend into said radial openings.

51. Apparatus for automatically adjusting a disc brake according to claim 49 further including a bushing fitted over said cylindrical portion of said brake piston and within said space defined by said sealing lips and said circumferential surface between said sealing lips.

52. Apparatus for automatically adjusting a disc brake, said apparatus comprising:
  a brake shoe;
  a brake cylinder;
  a hollow brake piston positioned for sliding movement within said brake cylinder to actuate said brake shoe and having a cylindrical portion extending into the interior of said brake piston from an end of said brake piston which actuates said brake shoe;
  a hydraulic unit for moving said brake piston to actuate said brake shoe;
  a mechanical unit for moving said brake piston to actuate said brake shoe;
  an extendable adjusting unit disposed between said brake piston and said mechanical actuating device and including:
    (a) a threaded spindle coupled to said mechanical unit, and (b) a nut threadedly engaging said threaded spindle and having a portion which:
  (i) extends over and surrounds said cylindrical portion of said brake piston, and
  (ii) is adapted to bear against said brake piston to prevent relative rotation between said nut and said brake piston;
and first and second ring-shaped, circumferential elastic sleeves each fixed to said adjusting nut and formed with a sealing lip which bears against said cylindrical portion of said brake piston, said sealing lips being apart axially and having a circumferential surface between them which is spaced from said cylindrical portion of said brake piston as long as hydraulic pressure applied by said hydraulic unit does not exceed a predetermined level.

53. Apparatus for automatically adjusting a disc brake according to claim 52 wherein an aeration duct extends through said brake piston to the space defined by said sealing lips and said circumferential surface between said sealing lips.

54. Apparatus for automatically adjusting a disc brake according to claim 53 wherein said nut has a bore and a groove extending axially of said bore and said apparatus further includes a rigid ring to which said elastic sleeves are fixed and having a radial projection extending into said groove for axial movement of said rigid ring.

* * * * *

UNITED STATES PATENT AND TRADEMARK OFFICE
CERTIFICATE OF CORRECTION

PATENT NO.   : 5,350,042
DATED        : September 27, 1994
INVENTOR(S)  : Rudolf Thiel It is certified that error appears in the above-identified patent and that said Letters Patent is hereby corrected as shown below:

In column 10, claim 30, line 19, delete "29" and substitute therefor --28--

In column 10, claim 34, line 40, delete "33" and substitute therefor --32--

In column 11, claim 44, line 53, delete "Distort" and substitute therefor --piston--

In column 12, claim 46, line 20, delete "Wherein" and substitute therefor --wherein--

Signed and Sealed this

Third Day of January, 1995

Attest:

BRUCE LEHMAN

*Attesting Officer*     *Commissioner of Patents and Trademarks*